United States Patent [19]
Serizawa et al.

[11] 3,988,027
[45] Oct. 26, 1976

[54] VEHICLE DRIVER PROTECTING STEERING ARRANGEMENT

[75] Inventors: Yoshio Serizawa, Tokyo; Yasuhiko Fujiwara, Yokohama, both of Japan

[73] Assignee: Nissan Motor Co., Ltd., Japan

[22] Filed: Feb. 19, 1974

[21] Appl. No.: 443,187

[30] Foreign Application Priority Data
Feb. 22, 1973 Japan.................................. 48-21638

[52] U.S. Cl................................. 280/87 C; 74/492
[51] Int. Cl.²............................................ B62D 1/18
[58] Field of Search........... 280/87 R, 87 A, 150 B; 180/103, 78, 82 R, 91; 74/492, 493

[56] References Cited
UNITED STATES PATENTS

| | | | |
|---|---|---|---|
| 2,254,640 | 9/1941 | Baker | 180/82 R |
| 2,548,244 | 4/1951 | Stein | 74/492 |
| 3,429,196 | 2/1969 | White | 74/493 |
| 3,487,710 | 1/1970 | Fergle | 74/492 |
| 3,521,724 | 7/1970 | Mayer | 180/91 |
| 3,556,550 | 1/1971 | Franchini | 280/87 |

*Primary Examiner*—Kenneth H. Betts
*Attorney, Agent, or Firm*—Robert E. Burns; Emmanuel J. Lobato; Bruce L. Adams

[57] ABSTRACT

A steering column is split into two column sections, the rear upper section of which is tiltable in a direction away from the head of a vehicle driver during a collision of the vehicle.

3 Claims, 8 Drawing Figures

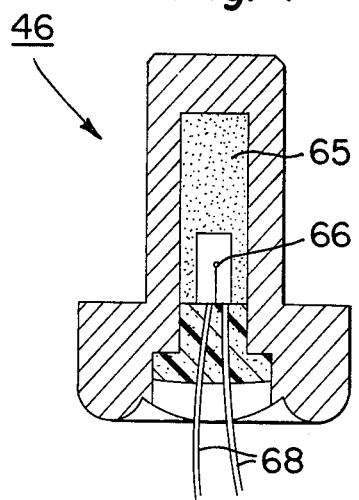
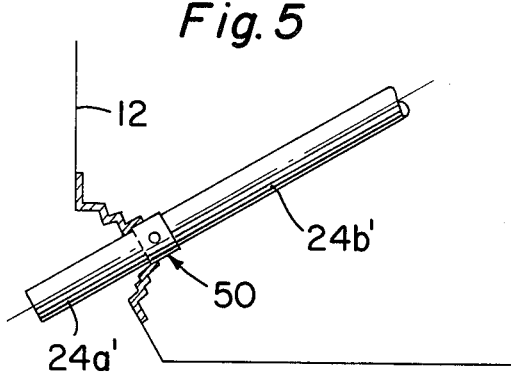
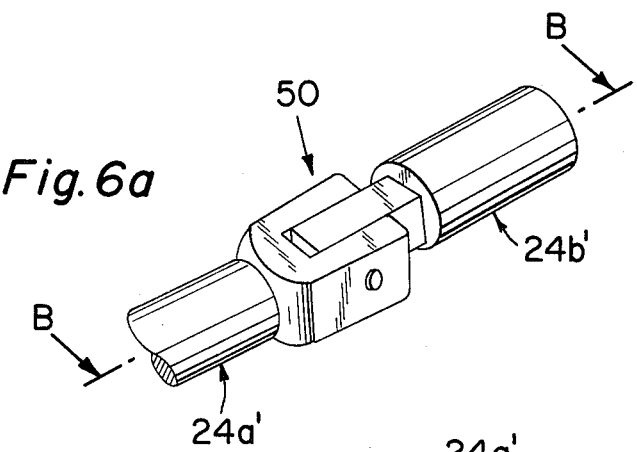
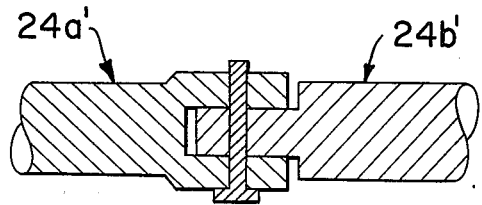

VEHICLE DRIVER PROTECTING STEERING ARRANGEMENT

This invention relates to improved steering arrangements for use in fast moving vehicles such as automobiles.

A general object of the invention is to provide a vehicle steering assembly particularly arranged to protect a vehicle driver from injuries resulting from a collision of the vehicle.

Another object of the invention is to provide a vehicle steering assembly in which an upper, rear section of a steering column carrying a steering wheel becomes gravitationally tiltable, relative to a lower front column section, in a direction away from the head of a vehicle driver, as soon as a collision occurs.

Still another object of the invention is to provide a vehicle steering assembly of the character mentioned above which is promptly responsive to a collision signal produced by a collision sensor for the tilting movement of the rear section of the steering column.

Further objects, features and advantages of the invention will become apparent as the description proceeds with reference to the accompanying drawing, in which:

FIG. 2b is a view in section taken along a line B—B of FIG. 2a.

FIG. 4 is an enlarged detailed view in longitudinal section of a detonator bolt shown in FIG. 2;

FIG. 5 is a fragmentary detailed view for further explanation of FIG. 3;

FIG. 6a is a fragmentary perspective view of part of the assembly shown in FIG. 5; and FIG. 6b is a view in section taken on the line B—B of FIG. 6a).

Figure 1:
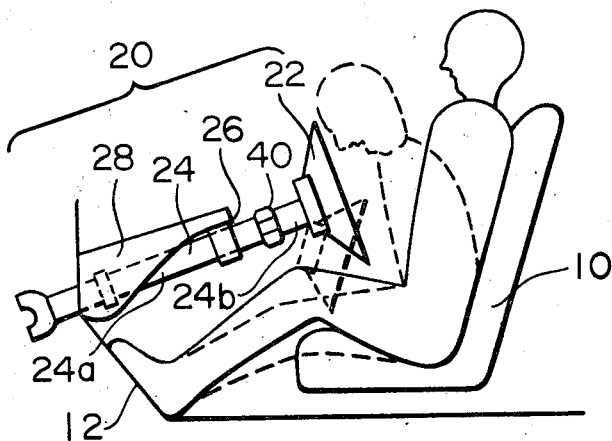
FIG. 1 is a schematic side view of a steering assembly of the invention and a seated driver in front of the steering assembly, with a normal condition shown in a solid line and a collision condition in a phantom line.

A vehicle body, the interior of which is partially illustrated in FIG. 1, is equipped with a seat 10 occupied by a vehicle driver. A steering device or assembly generally indicated as 20 is provided between the driver and a stationary part or dashboard 12 of the vehicle body. The assembly 20 conventionally comprises a steering column 24 carrying at its rear end a steering wheel 22. The other, front end of the steering column 24 extends through the dashboard 12 and is connected to a known steering gearbox (not shown). The column 24 is carried at one portion, preferably its midpoint by means of a mount bushing 26 which is fixed to a bracket 28 extending from the dashboard 12.

Figure 2A:
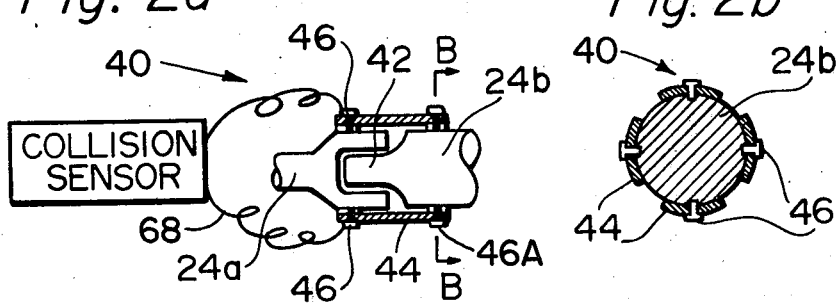
FIG. 2a is an enlarged sectional view of an important part of the steering column according to a preferred embodiment of the invention.
Figure 2B:
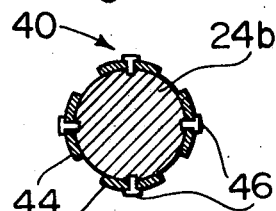

The steering column 24 according to the invention is split into a lower, front section 24a and an upper, rear section 24b, the latter being tiltable at 40 in case of the first embodiment shown in FIGS. 1 and 2. As is apparent from FIG. 2, the lower section 24a and the upper section 24b are connected to each other by a pivot joint or Hooke's universal joint 42, adjacent bushing 26. A retainer sleeve 44 consisting of four, circumferentially spaced, straps at least partly surrounds the adjacent ends of both the lower section 24a and the upper section 24b across the universal joint 42, the straps being curved to fit the surfaces of the steering column, connected thereto. The retainer 44 is fixed to the two sections 24a, 24b of the column 24 by means of a plurality of bolts 46, 46a, respectively. In the embodiment as shown in FIG. 2a, bolts 46 serve as detonators. Each of the detonator bolts 46 contains, as conventional, an explosive agent 65, and a primer 66, as shown in FIG. 4. There is provided a collision sensing device (no numeral) of any conventional type in a suitable part of the vehicle body such as an instrumental panel. The collision sensor is operatively connected to the primer 66 of the detonator bolts 46. The detonator bolts are most preferably of an electric type and inserted in an electric circuit 68 including the collision sensor as shown.

As soon as a collision occurs, the collision sensor is energized to ignite the primer then burning the explosive. The detonator bolts 46 are thus broken so that the retainer sleeve 44 is released from the column 24 to permit its upper rear section 24b to tilt relative to the lower section. As a result, the steering wheel 22 gravitationally falls on the lap of the driver or the seat surface. It will be therefore apparent that the danger of serious injuries resulting from a collision, which is very liable to occur when the head of the driver violently collides with the steering wheel, is advantageously precluded according to the invention. Even if the forward movement of the driver should be so strong that his head falls upon the rim of the fallen steering wheel, the momentum upon bumping is more alleviated than in case where the steering wheel is rigidly carried by a fixed steering column.

Figure 3:
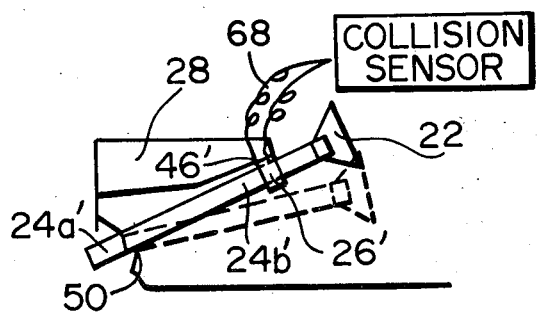
FIG. 3 is a steering column assembly according to another preferred embodiment of the invention.

Referring to another embodiment of the invention shown in FIGS. 3 and 5, a relatively long upper rear section 24b' is tiltable at 50 adjacent the dashboard 12 relative to a lower section 24a'. The upper section is pivoted to the lower one by a pivot joint similar to the one of FIG. 2 (see FIGS. 6a, 6b), but is carried in alignment with the lower column section by means of a mount bushing 26' fixed to the bracket 28, remote from the joint between the two sections rather than by a retainer surrounding the universal joint as in the first embodiment. The mount bushing 26' is secured to the bracket 28 by detonator bolts 46' like those shown in FIG. 2. Thus, when the bolts 46' are broken in response to the collision representing signal in the manner described, the upper column section 24b' a bushing means or joint is bent at 50, which in this embodiment is located at, and deformably fastened to the stationary part of the vehicle body, as shown. Section 24b' thus is gravitationally moved away from the bracket 28 as indicated by a phantom line.

What is claimed is:

1. A steering device for a vehicle which has collision sensor means for producing a collision representing signal, the device comprising;

a steering column having a front lower column section and a rear upper column section and a pivot joint connecting adjacent ends of the front section and the rear section for free gravitational downward, pivotal movement of the rear section in direction away from the head of a vehicle driver; and retainer means releasably connectable with the steering column for retaining the rear section in alignment with the front section to normally prevent said pivotal movement, said retainer means having a plurality of self-destroyable bolts to normally provide fixed connection of the retainer means with the steering column, said bolts being destroyable in response to a collision signal, whereby upon destruction of the bolts, the steering column is released from its fixed connection with the retainer means to enable said pivotal movement of the rear section with respect to the front section about the pivot joint.

2. A steering device for a vehicle which has collision sensor means for producing a collision representing signal, the device comprising;
   a steering column having a front lower column section and a rear upper column section;
   a pivot joint connecting adjacent ends of the front section and the rear section for free gravitational downward pivotal movement of the rear section in a direction away from the head of a vehicle driver; and
   retainer means for retaining the rear section in alignment with the front section to normally prevent said pivotal movement, said retainer means comprising a sleeve enclosing the adjacent ends of the rear section and front section across the pivot joint, and first and second detonator bolts for fixing the sleeve respectively to the rear section and the front section, said bolts being destroyable in response to a collision signal.

3. A steering device according to claim 2 wherein each detonator bolt contains a primer ignitable in response to the collision signal and an explosive explosible upon ignition of the primer, for self-destruction of the detonator bolt.

* * * * *